United States Patent [19]

Dougherty

[11] 4,192,584
[45] Mar. 11, 1980

[54] SYSTEM FOR CREATING MOTION EFFECTS EMPLOYING STILL PROJECTION EQUIPMENT

[75] Inventor: Walter S. Dougherty, Stone Mountain, Ga.

[73] Assignee: The United States of America as represented by the Department of Health, Education and Welfare, Washington, D.C.

[21] Appl. No.: 933,746

[22] Filed: Aug. 15, 1978

[51] Int. Cl.² .................. G03B 21/26; G03B 21/14
[52] U.S. Cl. ........................................ 353/30; 353/94; 353/48; 353/DIG. 5
[58] Field of Search ................. 353/30, 37, 46, 48, 353/94, 95, 121, 122, 22, 23, 24, 85, DIG. 3, DIG. 5; 40/343, 437, 438, 436

[56] References Cited

U.S. PATENT DOCUMENTS

| | | | |
|---|---|---|---|
| 2,217,240 | 10/1940 | Stumpf | 353/46 X |
| 2,944,461 | 7/1960 | Howell et al. | 353/DIG. 3 |
| 3,667,145 | 6/1972 | Wright | 353/46 X |
| 3,923,390 | 12/1975 | Susko | 353/122 X |
| 4,125,321 | 11/1978 | Wright | 353/30 X |

Primary Examiner—Harry N. Haroian
Attorney, Agent, or Firm—Browdy and Neimark

[57] ABSTRACT

A system for creating projected visual motion effects for filming or videotaping, with the use of still projection equipment, involves projecting a still image on a screen from a slide projector, projecting a second image on the screen, superimposed on the first image, and causing the projected second image to move rectilinearly at a controlled variable speed and in a selected direction over the first projected still image. This movement is accomplished with a "crawler" assembly having a transparent rectilinearly movable carrier panel carrying the second image over the stage surface of a standard overhead projector, or a light box, constituting the second image light source. The illuminated second image is directed to the screen by an overhead lens and suitably angled mirror. The transparent carrier is driven by a variable-speed reversible motor through a changeable worm gear drive assembly coupled to friction drive rollers engaging the carrier, which is slidably supportingly retained in a guide frame. The guide frame may be disposed at different desired angles over the light box to obtain different desired directions of movement of the projected second image.

19 Claims, 8 Drawing Figures

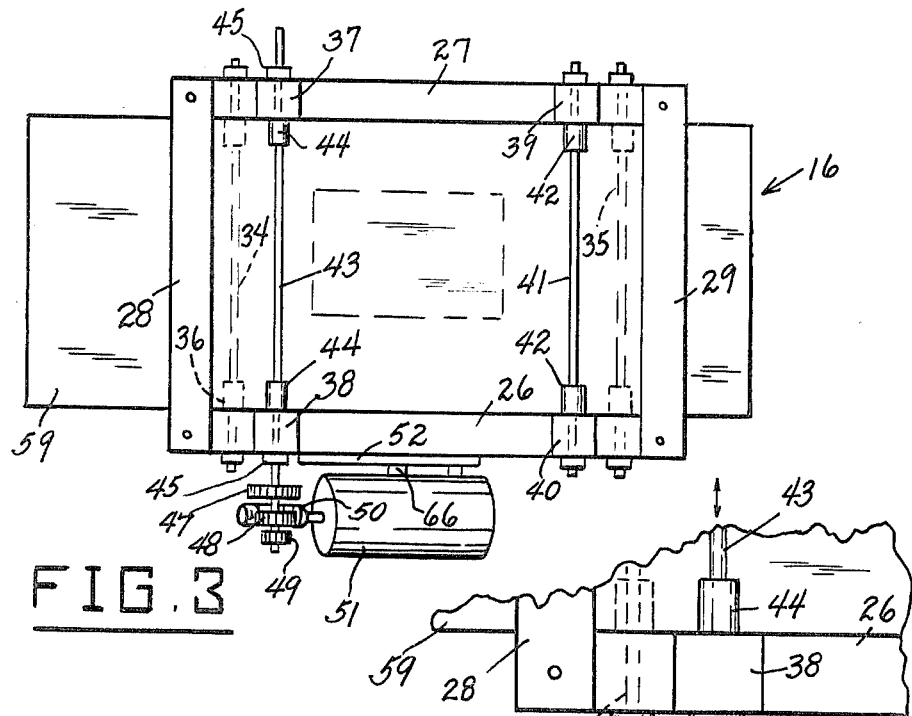
FIG. 3
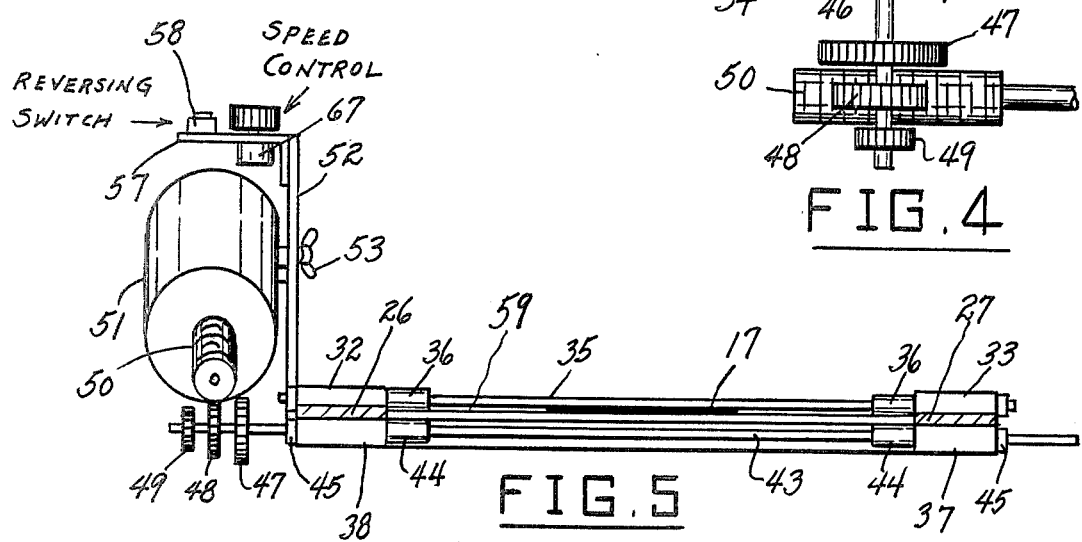
FIG. 4
FIG. 5
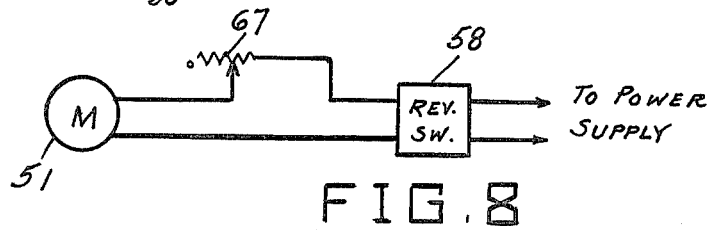
FIG. 8

SYSTEM FOR CREATING MOTION EFFECTS EMPLOYING STILL PROJECTION EQUIPMENT

FIELD OF THE INVENTION

This invention relates to image projection systems, and more particularly to a system for creating visual motion effects, employing still picture projection equipment.

BACKGROUND OF THE INVENTION

Previously proposed systems for creating special motion effects, for example, for filming with motion picture cameras or video tape cameras, have involved the use of highly sophisticated and expensive techniques and animation equipment. Some of these previous systems do not per se create motion effects but instead merely project previously filmed motion over a still picture, thus restricting the presentation to whatever movements were filmed rather than allowing the operator to control the movement or change at any selected time during the presentation. Other prior systems are very complex, using elaborate arrays of mirrors, prisms, and other optical components, and most of these still suffer from lack of precise control of speed, direction and intensity of the projected moving images. In some of the prior devices, rotating discs are employed which can only project images in an arcuate pattern of motion, with no rectilinear movement possible, and frequently the variety of images which can be projected is quite limited.

Examples of such prior systems for producing images with motion effects are disclosed in the following prior U.S. Pat. Nos. found as a result of a preliminary search:
Garrette, 1,156,896
Smith, 1,394,797
Merrill, 1,939,597
Stamm, 3,240,116
Udich, 3,339,453
Liguori, 3,472,587

SUMMARY OF THE INVENTION

Accordingly, an object of the invention is to provide an improved projection system for creating visual motion effects which overcomes the deficiencies and disadvantages of the previously employed systems.

A further object of the invention is to provide an improved, practical and inexpensive system to create visual motion effects, suitable for filming or videotaping, which utilizes still image projection equipment, which is easy to operate, and which provides precise control of the speed, direction and intensity of the motion effects.

A still further object of the invention is to provide an improved method and apparatus for creating motion effects for photographing by a motion picture camera or by a video camera for direct videotaping, involving merely the use of a conventional first slide projector for producing a still first projected image, and a second simple and inexpensive standard overhead projector for superimposing an accurately controlled moving image on the first projected image.

A still further object of the invention is to provide an improved system for creating visual projected motion effects by superimposition of a moving image on a still image, the system being suitable for direct photography of the motion effects, videotaping for television presentation, for live presentation such as in classrooms or lecture auditoriums, or for a large number of other presentations requiring such moving visual effects wherein the motion is required to be regulated accurately as to speed, direction and intensity relative to a still picture background.

A still further object of the invention is to provide an improved motion effect visual projection system suitable for projecting moving indicia on a stationary projected background, for projecting moving labels, titles, line drawings, mask elements, arrows, symbols, moving textures, fused or changing color effects, and the like, wherein speed, intensity and direction of the motion effects can be accurately controlled.

BRIEF DESCRIPTION OF THE DRAWINGS

For a better understanding of the invention, a possible non-limiting embodiment thereof will now be described with reference to the drawing.

Further objects and advantages of the invention will become apparent from the following description and from the accompanying drawing, wherein:

FIG. 3 is a bottom plan view of the crawler assembly of FIG. 2.

FIG. 4 is a fragmentary enlarged bottom plan view of a corner portion of the crawler assembly, showing the worm drive gearing for the linearly movable transparent carrier panel employed in the assembly.

FIG. 5 is an enlarged transverse vertical cross-sectional view taken substantially on the line 5—5 of FIG. 2.

FIG. 8 is a wiring diagram of a typical motor control circuit which may be employed in the system of FIG. 1.

DESCRIPTION OF A PREFERRED EMBODIMENT

Figure 1:
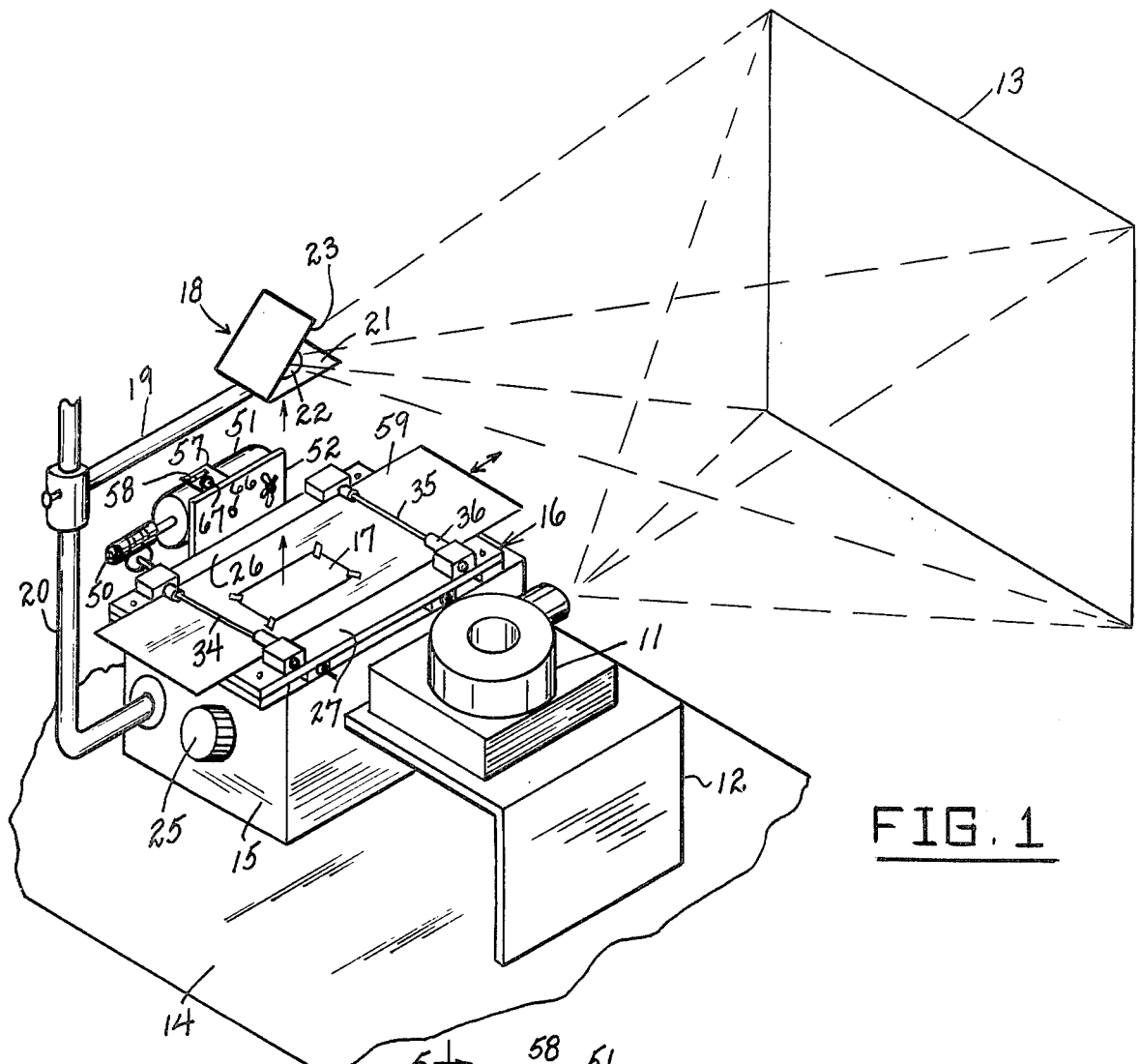
FIG. 1 is a perspective view showing an arrangement of equipment according to the present invention for creating motion effects using still picture projection apparatus.

Referring to the drawings, and more particularly to FIG. 1, a typical system according to the present invention comprises a conventional slide projector 11 placed on a rigid elevated support 12 secured on a table 14 for projecting a stationary background first image on a screen 13 at a suitable projection distance, for example, about 12 feet. A second image is projected onto screen 13 and is superimposed over the first image, by means of a rheostat controlled-overhead projector, or an optical projection system comprising a variable-intensity light box 15 located on table 14 adjacent support 12, on which is movably disposed a "crawler" unit 16, located in the path of light from the overhead projector or clear top of light box 15, so as to brightly illuminate a transparency 17 carrying the second image to be projected. A projection unit 18 is adjustably mounted above the transparency 17, for example, on a horizontal supporting arm 19 adjustably secured on a vertical post member 20 of the conventional overhead projector or light box mounted on table 14. The projection unit 18 comprises a horizontal lens plate 21 provided with a projection lens 22 and a suitably angled mirror 23 arranged to direct the second-image rays from lens 22 onto the screen 13.

Figure 7:
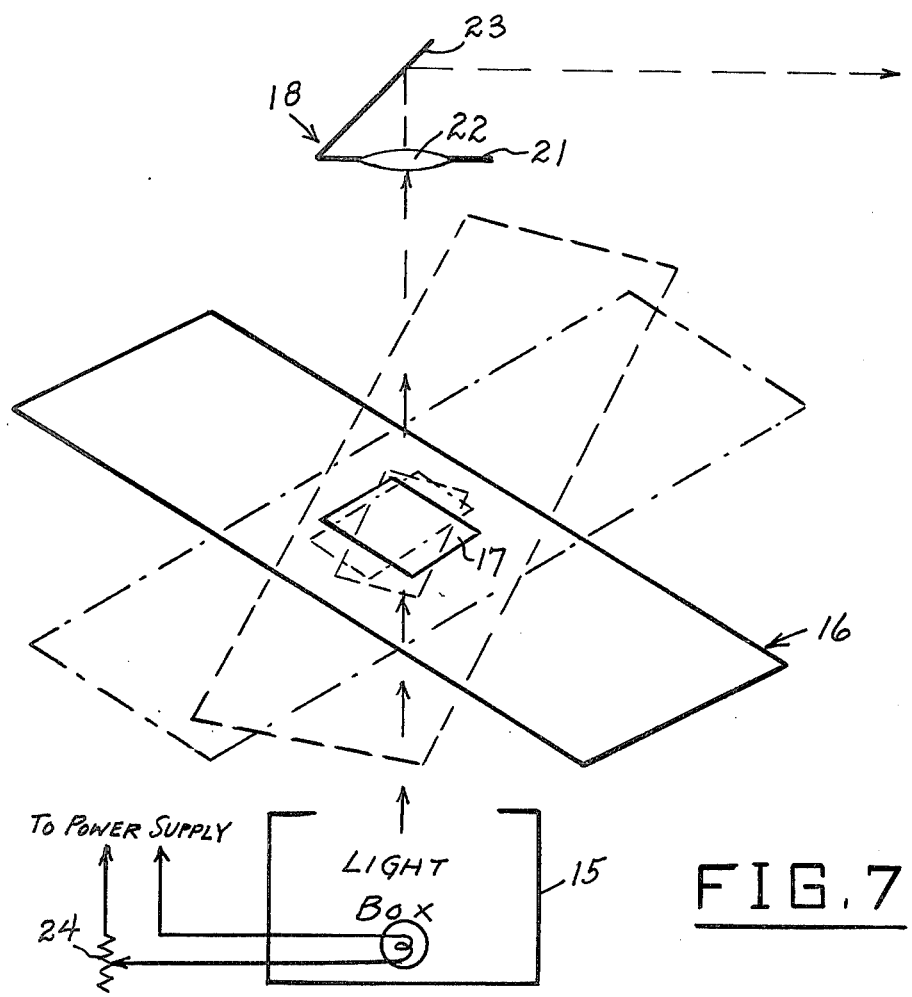
FIG. 7 is a diagrammatic view showing the manner in which the crawler assembly may be placed at different angles with respect to its projection system to obtain projected superimposed motion effects corresponding to such angles.

The intensity of the light from the overhead projector or light box 15 may be adjusted in any suitable manner, for example, by means of a dimmer rheostat 24 connected in the lamp energizing circuit of the overhead projector or light box 15, as shown diagrammatically in FIG. 7, said rheostat being provided with a control knob 25.

Figure 2:
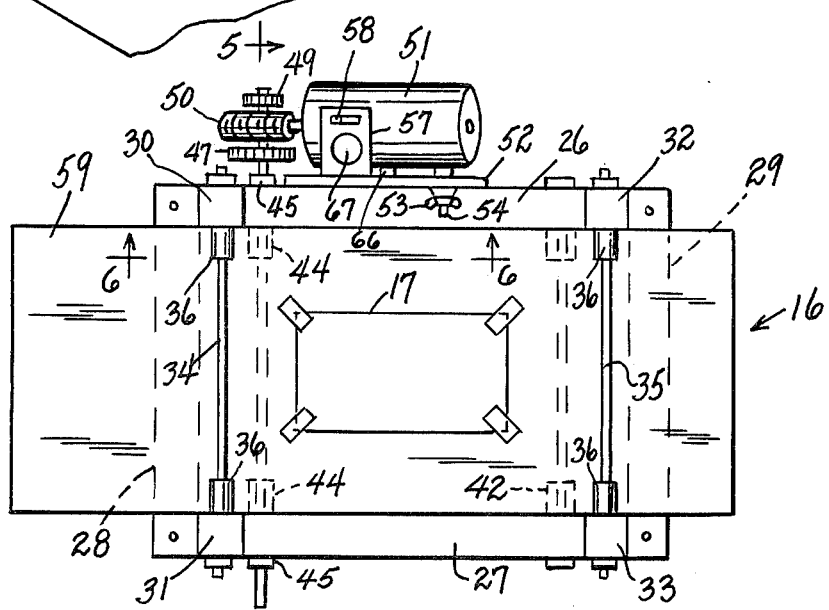
FIG. 2 is a top plan view of a motion-creating "crawler" assembly which carries a moving second image to be superimposed over a projected first image, as employed in the arrangement of FIG. 1.

The crawler unit 16 comprises a generally rectangular main frame comprising a pair of spaced parallel elongated flat longitudinal bars 26,27 rigidly secured at their ends on the ends of similar flat transverse bars 28,29, as shown in FIG. 2. The top surfaces of the bars 26,27 are provided with upstanding transversely aligned bearing blocks 30,31 adjacent bar 28, and similarly are provided adjacent bar 29 with transversely aligned bearing blocks 32,33. Rotatably mounted in the spaced pairs of bearing blocks 30,31 and 32,33 are transverse shafts 34,35 provided with pairs of opposite resilient deformable friction rollers 36. As shown in FIG. 3, the bottom surfaces of the bars 26,27 are likewise provided with depending transversely aligned bearing blocks 37,38 and 39,40 slightly spaced inwardly from the shafts 34,35. A transverse shaft 41 is journalled in the bearing blocks 39,40, carrying opposite resilient deformable friction rollers 42,42. An axially adjustable transverse shaft 43 is slidably journalled in bearing blocks 37,38, provided with opposite resilient deformable friction rollers 44,44. The rollers 44,44 engage shaft 43 with tight frictional contact, but may be manually shifted along the shaft, as required when said shaft is axially adjusted. The shaft 43 is provided outwardly adjacent the blocks 37,38 with releasable bearing collars having set screws 46 for locking the collars in adjusted positions, as shown in FIG. 4, said collars being designated at 45.

Figure 6:
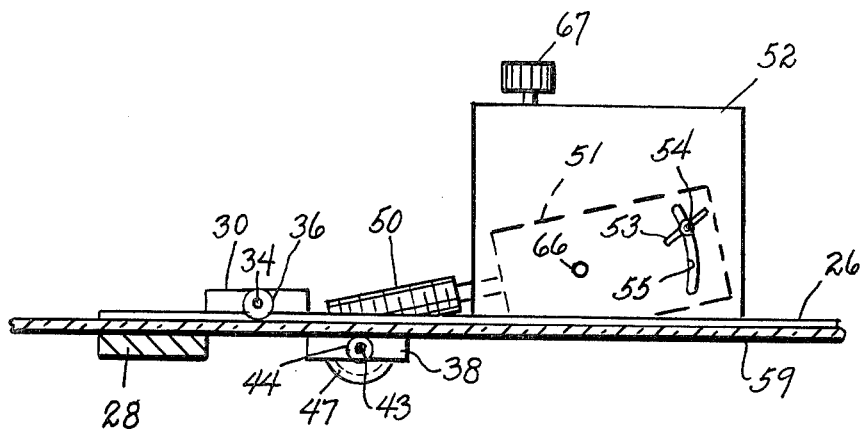
FIG. 6 is a fragmentary enlarged vertical cross-sectional view taken substantially on the line 6—6 of FIG. 2.

Shaft 43 is provided with a series of spaced differently-sized speed-change worm gears 47,48,49 selectively drivingly engageable by a worm member 50 on the shaft of a reversible, variable-speed drive motor 51 pivotally secured at 66 on an upstanding vertical plate member 52 in parallel relation therewith, said plate member 52 being rigidly secured to the outer longitudinal side edge of bar 26. The motor may be locked in selected drive-ratio position, namely, with worm 50 meshingly engaging a selected worm gear 47,48 or 49, by a wing nut 53 threadedly engaged on a stud 54 carried by motor 51 and projecting through an arcuate slot 55 provided in plate member 52, as shown in FIG. 6.

An angle bracket 57 rigidly secured to the top margin of plate member 52 carries a reversing switch 58 and a speed control rheostat 67 connected in the energizing circuit of motor 51, as shown diagrammatically in FIG. 8.

Designated at 59 is an elongated rectangular transparent thin plate-like carrier member of glass or other suitable transparent sheet material which is slidably engaged between the longitudinal bars 26,27 and is clampingly supported between the upper resilient deformable rollers 36 and the lower resilient deformable rollers 44,42. The rollers 44,44 act as drive rollers to move the carrier member 59 rectilinearly responsive to the energization of motor 51. The speed of movement can be varied by mans of speed control rheostat 67, and the direction of movement can be controlled by means of reversing switch 58, namely, backwards or forward on the crawler frame. The second-image transparency 17 can be removably secured on carrier member 59 in any suitable manner, for example, by means of cellophane tape, or the like. The intensity of the projected moving second image can be readily varied by means of the light box lamp rheostat 24. The angular position of movement of the projected second image relative to the stationary first image can be varied by manually angularly horizontally shifting the position of the crawler assembly 16 on the overhead projector or light box 15, as shown diagrammatically in FIG. 7, and, if so desired, the crawler unit 16 may be manually rotated horizontally while carrier member 59 is moving to provide a combination of rectilinear and angular movement of the superimposed second image on the stationary first image. Alternatively, the motor 51 may be deenergized and the unit 16 may be merely manually rotated horizontally to provide only angular movement of the superimposed second image.

It will thus be seen that a large number of superimposed second-image motion effects can be readily obtained by the above-described system, such as moving the second projected image relatively in either lateral direction (up, down, sideways, backwards, and diagonally) to any degree. As above mentioned, by manipulating the second-image projection material (crawler 16) it can also be projected with an arcuate motion. The following are specific typical examples of visual effects obtainable by the above-described system:

a. It can burn in a white line drawing over a projected color slide background.

b. It can expose labels, titles, etc., individually over any type of background material.

c. It can reveal a bar chart continuously and incrementally by means of a moving mask.

d. It can move arrows, symbols and shapes from point to point (stopping at each).

e. It can "fly" part of a title or other image into or out of the picture area.

f. It can create both a title and a moving textured background from one projector simultaneously.

g. It can create moving textures within a given shape from one projector simultaneously and/or superimpose it over a background from a second projector.

h. By using a supplemental device to elevate part of the image, a fused color effect (such as blood color changes flowing through a vein) can be demonstrated.

i. A graph line can be made to draw itself on a grid background.

j. The above-described actions can be performed with speed variations and light intensity changes, with accurate control of such changes.

k. Images can be created with the crawler from such materials as typewriter type, line drawings made into 4×5 negatives, drawings made directly on acetate, paper cutouts, pieces of color gel, and any other type of material that will be capable of being projected from an overhead projection unit.

The quality of image projection has been shown to be suitable for filming and for videotaping for television, as well as for direct presentation to a live audience.

The material used on the crawler 16 can generally comprise small-scale drawings or pictures in the form of slides, photographic negatives, paper cutouts, and the like.

In operation, the element 17 carrying the image to be superimposed on and moved over the still image is mounted on the carrier 59 and is projected onto the still image in the manner above described. The angle of movement of the superimposed image is adjusted by rotating the crawler 16 horizontally to the desired angular position. The intensity of the moving image is regulated by means of the dimmer knob 25, the speed of movement is controlled by means of the rheostat 67, and the forward or reverse direction of movement is controlled by means of the reversing switch 58.

If so desired, the crawler-supporting light box 15 itself may be pivotally mounted for rotation around a vertical axis to provide the required adjustment of the angle of movement of the image on element 17.

As above mentioned, the composite picture, containing the motion-creating effects, can be filmed with a conventional motion picture camera, or videotaped by means of a conventional video camera and associated taping equipment.

While a specific embodiment of an improved system for creating motion effects employing still projection equipment has been disclosed in the foregoing description, it will be understood that various modifications within the scope of the invention may occur to those skilled in the art. Therefore it is intended that adaptations and modifications should and are intended to be comprehended within the meaning and range of equivalents of the disclosed embodiment.

What is claimed is:

1. Projection apparatus for producing visual motion effects, the apparatus comprising a viewing surface, a first projection means to project a still first image onto said viewing surface, a second projection means to project a moving second image onto said viewing surface superimposed on said first image, said second projection means comprising a light source provided with a housing having a clear top portion, carrier means supported over said clear top portion, an image-forming element on said carrier means arranged to be illuminated by said light source, projection lens means focussed on said image-forming element, means arranged to direct output light rays from said lens means toward said viewing surface, whereby a second image from said image-forming element is superimposed on the still first image, means for varying the intensity of said light source to selectively vary the intensity of said second image superimposed over said first image, said carrier means being capable of orientation selectively in different directions around the optical axis of said lens means, said carrier means being rotatably movable about an axis substantially perpendicular to its plane of rectilinear movement for varying its direction of movement, transport means to move said carrier means rectilinearly over said light source to cause the superimposed second image to move rectilinearly over the still first image on said viewing surface in a direction in accordance with the orientation of said carrier means, and means to vary the speed of rectilinear movement of the carrier means over the light source.

2. The projection apparatus of claim 1, and wherein said transport means comprises a substantially rigid frame, means to support said frame over said clear top portion, and rectilinear drive means on the frame drivingly engaging said carrier means.

3. The projection apparatus of claim 2, and wherein said carrier means comprises an elongated transparent plate-like member.

4. The projection apparatus of claim 2, and wherein said carrier means comprises an elongated plate-like member having parallel side edges, and wherein said frame is provided with guiding abutment elements at its side edge portions between which said plate-like member is substantially slidably received.

5. The projection apparatus of claim 4, and wherein said frame is provided with opposite resilient roller means clampingly engaging the plate-like member therebetween.

6. The projection apparatus of claim 5, and wherein said drive means includes motor means drivingly connected to said resilient roller means.

7. The projection apparatus of claim 6, and means to vary the speed of said motor means, whereby to correspondingly vary the speed of movement of the superimposed second projected image relative to the still first image.

8. The projection apparatus of claim 6, and means to at times reverse the drive direction of the motor means, whereby to reverse the direction of movement of the superimposed second projected image relative to the still first image.

9. The projection apparatus of claim 6, and means to vary the speed of said motor means to thereby correspondingly vary the speed of movement of the superimposed second image relative to the still first image, said speed-varying means including changeable gearing between said motor means and said resilient roller means.

10. Projection apparatus for producing visual motion effects, the apparatus comprising a viewing surface, a first projection means to project a still first image onto said viewing surface, and a second projection means to project a moving second image onto said viewing surface superimposed on said first image, said second projection means comprising a light source provided with a housing having a clear top portion, carrier means supported over said clear top portion, an image-forming element on said carrier means arranged to be illuminated by said light source, projection lens means focussed on said image-forming element, means arranged to direct output light rays from said lens means toward said viewing surface to cause a second image from said image-forming element to be superimposed on the still first image, said carrier means being capable of orientation selectively in different directions around the optical axis of said lens means, transport means to move said carrier means rectilinearly over said light source to cause the superimposed second image to move rectilinearly over the still first image on said viewing surface in a direction in accordance with the orientation of said carrier means, wherein said transport means comprises a substantially rigid frame, means to support said frame over said clear top portion, and rectilinear drive means on the frame drivingly engaging said carrier means, wherein said carrier means comprises an elongated plate-like member having parallel side edges, wherein said frame is provided with guiding abutment elements at its side edge portions between which said plate-like member is substantially slidably received, wherein said frame is provided with opposite resilient roller means clampingly engaging the plate-like member therebetween, wherein said drive means includes motor means drivingly connected to said resilient roller means, and wherein said resilient roller means includes a roller drive shaft journalled transversely on said frame provided with a plurality of axially spaced differently-sized gears and said motor means comprises a motor pivotally mounted on said frame and having a driving worm element selectively engageable with said gears, and means to adjust said roller drive shaft axially to drivingly engage a selected gear with said worm element.

11. The projection apparatus of claim 10, and wherein said frame is provided with an upstanding plate member at one side edge thereof and said motor is pivotally mounted on said upstanding plate member.

12. The projection apparatus of claim 11, and wherein said upstanding plate member is formed with an arcuate slot adjacent said motor, and wherein the motor is provided with a stud bolt extending through said slot and a clamping nut threadedly engaged on the stud bolt to lock the gearing adjustment of the motor relative to said roller drive shaft.

13. The projection apparatus of claim 10, and means to vary the speed of rectilinear movement of the carrier means over the light source.

14. The projection apparatus of claim 13, and means to vary the intensity of said light source, whereby the intensity of said second image superimposed over the still first image can be varied at times.

15. The projection apparatus of claim 13, and means to at times reverse the direction of rectilinear movement of the carrier means over the light source.

16. The projection apparatus of claim 13, and wherein said carrier means is rotatably movable around an axis perpendicular to its plane of rectilinear movement for varying its direction of movement.

17. The projection apparatus of claim 10, and means to vary the speed of said motor means, whereby to correspondingly vary the speed of movement of the superimposed second projected image relative to the still first image.

18. The projection apparatus of claim 10, and means to at times reverse the drive direction of the motor means, whereby to reverse the direction of movement of the superimposed second projected image relative to the still first image.

19. The projection apparatus of claim 10, and means to vary the speed of said motor means to thereby correspondingly vary the speed of movement of the superimposed second image relative to the still first image, said speed-varying means including changeable gearing between said motor means and said resilient roller means.

* * * * *